United States Patent [19]

Tanaka

[11] Patent Number: 5,251,030
[45] Date of Patent: Oct. 5, 1993

[54] MC PREDICTING APPARATUS

[75] Inventor: Kouichi Tanaka, Kanagawa, Japan

[73] Assignee: Mitsubishi Denki Kabushiki Kaisha, Tokyo, Japan

[21] Appl. No.: 896,327

[22] Filed: Jun. 10, 1992

[30] Foreign Application Priority Data

Jun. 12, 1991 [JP] Japan .................................. 3-167774

[51] Int. Cl.$^5$ .......................................... H04N 7/137
[52] U.S. Cl. .................................... 358/136; 358/105; 358/135
[58] Field of Search .......................... 358/105, 135, 136

[56] References Cited

U.S. PATENT DOCUMENTS

| | | | |
|---|---|---|---|
| 4,307,420 | 12/1981 | Ninomiya et al. | 358/105 |
| 4,670,851 | 6/1987 | Murakami et al. | 364/518 |
| 4,689,673 | 8/1987 | Ohki et al. | 358/136 |
| 4,933,761 | 6/1990 | Murakami et al. | 358/133 |

OTHER PUBLICATIONS

Anil K. Jain, "Image Data Compression: A Review" Proceedings of the IEEE, Mar. 3, 1981.
International Telegraph & Telephone Consultative Committee, Study Group XV-Report R 37.

Primary Examiner—Tommy P. Chin
Assistant Examiner—Richard Lee
Attorney, Agent, or Firm—Wolf, Greenfield & Sacks

[57] ABSTRACT

An MC predicting apparatus which ensures a high prediction accuracy against input image signal stream and avoids arithmetic operation of an evaluation function from becoming an overhead for an image encoding process is provided. Sequence numbers given to respective frames are discriminated, and a degree of interframe correlation is decided from a difference in sequence number of the preceding and current frames. A reference block generator adaptively controls, depending on the degree of interframe correlation, the reference range of MC prediction of the preceding frame stored in a frame memory. As a result, the number of times of arithmetic operation of an evaluation function for MC prediction can be reduced and a prediction accuracy can be improved.

9 Claims, 5 Drawing Sheets

MC PREDICTING APPARATUS

BACKGROUND OF THE INVENTION

1. Field of the Invention

The present invention relates to an image encoding apparatus, and, more particularly, to a motion compensated (MC) predicting apparatus to be used in an image communication apparatus for television conferences, videophones, etc.

2. Description of the Prior Art

In an image encoding process, as described in the article "High Efficiency Encoding Technology", written by Tokumichi Murakami (Proceedings of the Institute of Television Engineers of Japan), Vol. 42, No. 11, p 1198-), a moving image is conceived as a succession of still images, blocks are formed from some digital image signals which locate closely within a frame and this block is processed as a unit of an encoding process. Hereinafter, one stationary image is called a frame. High efficiency compression is conducted for an amount of image information by applying a combination of a variety of encoding processes, namely an encoding algorithm, to such blocks formed as outlined above. Especially, compensated prediction of motion is considered to be one of the encoding processes utilizing a tight correlation between frames.

FIG. 1 is a block diagram indicating a simplified structure of an ordinary image encoding/decoding system described in the above article. In FIG. 1, the reference numeral 1 denotes an A/D converter; 2 a format converter; 3 a source encoder; 4 a video multiplex encoder; 5 a transmitting controller; 6 a transmission line; 7 a receiving controller; 8 a video multiplex decoder; 9 a source decoder; 10 a format inverse-converter; and 11 a D/A converter.

Operation of the image encoder will be explained hereunder.

In FIG. 1, an image signal input from a TV camera, etc. is digitized by A/D converter 1, rearranged in format converter 2 into a format suitable for source encoding to form an input block. Source encoder 3 generates a prediction signal stream (hereinafter referred to as a prediction block) for each input block, applies an encoding algorithm to a differential signal stream (hereinafter referred to as a prediction error block) between the input block and the prediction block and thereby reduces a quantity of information.

Various encoding data are encoded into Variable Length Codes (VLC) and multiplexed in video multiplex encoder 4 and then transmitted to transmission line 6 under the control of transmitting controller 5. Receiving controller 7 receives the multiplexed VLC data from transmission line 6 and the received data are demultiplexed and decoded in video multiplex decoder 8. Source decoder 9 decodes the demultiplexed data and reproduces the input block by the reverse procedure of the source encoder 3. The decoded input block is converted to the original signal stream in format inverse-converter 10 and is then converted to an analog signal in D/A converter 11.

Next, operation of source encoder 3 will be explained in detail.

An encoding algorithm except a prediction is applied to a prediction error block which acts as a differential between an input block and a prediction block to develop a prediction error block to be encoded into such encoding data as a mean value, a deviation component and a quantization-encoded value. These encoding data are encoded into VLC and multiplexed together with an identifier of the prediction block. However, the prediction error blocks which are confirmed "insignificant" based on the following evaluation standard are not subjected to such processing.

Mean value $>Th_1$ or Deviation component$>Th_2$ ... significant

Others ... insignificant

Here, $Th_1$ and $Th_2$ are significant/insignificant threshold values of the mean value and the deviation component of the prediction error block to be encoded and the quality of image to be encoded (for example, image quality and the number of transmitting frames) is controlled in accordance with these threshold values.

As the evaluation standard explained above indicates, the accuracy of prediction for an input block is one of the factors which give large influence on the quality of the encoded image.

The quality of the encoded image is largely influenced by an amount of code information generated per frame, depending on a prediction accuracy in an input block and threshold values $Th_1$ and $Th_2$. In general, the larger the amount of code information generated, the greater the quality enhancement of each frame, thus the number of transmittable frames are getting less.

Threshold values $Th_1$ and $Th_2$ control the quantity of code information to be generated per frame as uniformly as possible so as to unify the quality of the encoded image. Therefore, if a prediction accuracy in an input block is low, the amount of code information generated in the area having a low prediction accuracy remarkably increases and threshold values $Th_1$ and $Th_2$ become large in order to control the amount of generated code information which is locally increased. Accordingly, the quality of each frame is deteriorated and the number of transmitted frames is reduced. Reduction in the number of transmitted frames results in a reduction in correlation between successive frames.

In many cases of encoding a moving image, the amount of information is reduced by utilizing a correlation between successive frames. Namely, the quality of an image to be encoded can be improved by applying motion compensated (MC) prediction between frames to prediction of an input block.

FIG. 2 is a diagram illustrating the concept of MC prediction. In MC prediction, a group of reference blocks consisting of a plurality of MC prediction blocks or pattern prediction blocks is prepared and the block which is the most similar to the input block is selected as a prediction block. The most similar prediction block is selected, for example, from the reference block group on the basis of tournament system by utilizing arithmetic distortion operation (a distortion in differential absolute value, etc.) as an evaluation function. Tournament systems such as the total search system and multistage matching system have been proposed.

The reference range of an MC prediction block is narrower than the total area of one frame and is often fixed in the vicinity of the same position as that of an input block. For instance, the reference range of an MC prediction block found in CCITT Recommendation H.261 is limited to within ±15 pixels for the same position of input blocks.

FIG. 3 is a functional block diagram of format converter 2 and source encoder 3 in the conventional motion compensated (MC) predicting apparatus shown in FIG. 1. In this figure, format converter 2 includes a block former 210 and source encoder 3 comprises an MC predicting unit 310, a high efficiency encoder 320, a local decoder 330, a frame memory 340 and a reference block generator 350.

Operation of the respective functional blocks will be explained hereunder with reference to the accompanying drawings.

A digital video signal is formed into an input block by block former 210 and is then transmitted to source encoder 3. In source encoder 3, MC predicting unit 310 executes MC prediction for the input block. Reference block generator 350 accesses frame memory 340 to read a signal stream within a preset reference range as a reference block from a locally decoded signal of a preceding frame.

A prediction error block which has been MC predicted is developed to various encoded data in high efficiency encoder 320 and are transferred to video multiplex encoder 4 and local decoder 330. In local decoder 330, various encoded data are locally decoded in the sequence reverse to the processing performed in high efficiency encoder 320 and are stored in frame memory 340 for MC prediction of the next frame.

Since a conventional image encoder utilizing an MC prediction method is structured such as described above, it is expected that, in MC prediction for frames where the number of transmitted frames is large and an adequate amount of code information is generated, the most approximate prediction block is selected from a minute fluctuating region of the same position of the input block. Therefore, arithmetic operation of the evaluation function in the range outside the minute fluctuating region becomes an overhead of the image coding process.

Moreover, in MC prediction for frames where the number of transmitted frames is small and a large amount of code information is generated, prediction accuracy against input block deteriorates because a reference range of a required MC prediction block is thought to exceed a preset range.

SUMMARY OF THE INVENTION

It is an object of the present invention to provide an MC predicting apparatus which ensures a high prediction accuracy against an input block and avoids arithmetic operation of an evaluation function from becoming an overhead for image encoding process.

An MC predicting apparatus according to the present invention comprises: a first means for outputting an input block by forming a block from a digital image signal stream within a frame; a second means for outputting a prediction error block by obtaining a difference between the input block and a prediction block selected from a reference block group including a plurality of prediction blocks located in the same position as or in the vicinity of the position of the input block; a third means for transforming the prediction error block to encoded data; a fourth means for adding a sequence number to each frame; and a fifth means for causing the second means to adaptively control a reference range of the reference block group in accordance with interframe correlation corresponding to a difference in sequence number of the current and preceding frames.

In the one embodiment, the fifth means causes the second means to adaptively change the size of the reference range of the reference block group in accordance with interframe correlation. According to this embodiment, the number of arithmetic operations of an evaluation function for MC prediction can be reduced when the motion vectors are expected to be small and prediction accuracy can be improved when the motion vectors are expected to be big, by discriminating a sequence number of a frame to decide a correlation between the current and preceding frames on the basis of a difference in sequence number between these frames and change the size of the reference range of a prediction block depending on interframe correlation.

In another embodiment, the fifth means modifies a motion vector of the preceding frame in the same position as that of the input block in accordance with a difference in sequence number between the current and preceding frames, causes the second means to correct the position of the input block using such a modification as an initial displacement, thereby correcting the position of the input block as the standard position of the plurality of prediction blocks. According to this embodiment, redundancy of the reference range of the prediction block can be reduced by correcting the standard position of a reference range of a prediction block by a motion vector in the preceding frame and a parameter determined by a degree of correlation between the preceding and current frames.

In a further embodiment, the fifth means causes the second means to adaptively control the standard position and the reference range of prediction block group in accordance with a difference between the sequence numbers of the current and preceding frames.

According to this embodiment, the number of arithmetic operations of an evaluation function can be reduced and prediction accuracy against input block can be improved by adaptively controlling the standard position and the reference range of a prediction block group in accordance with a difference in sequence number of the current and preceding frames.

These and other objects and advantages of the present invention will be more apparent from the following description with reference to the accompanying drawings.

DESCRIPTION OF THE PREFERRED EMBODIMENT

An MC predicting apparatus of the present invention will be explained hereunder.

Figure 1:
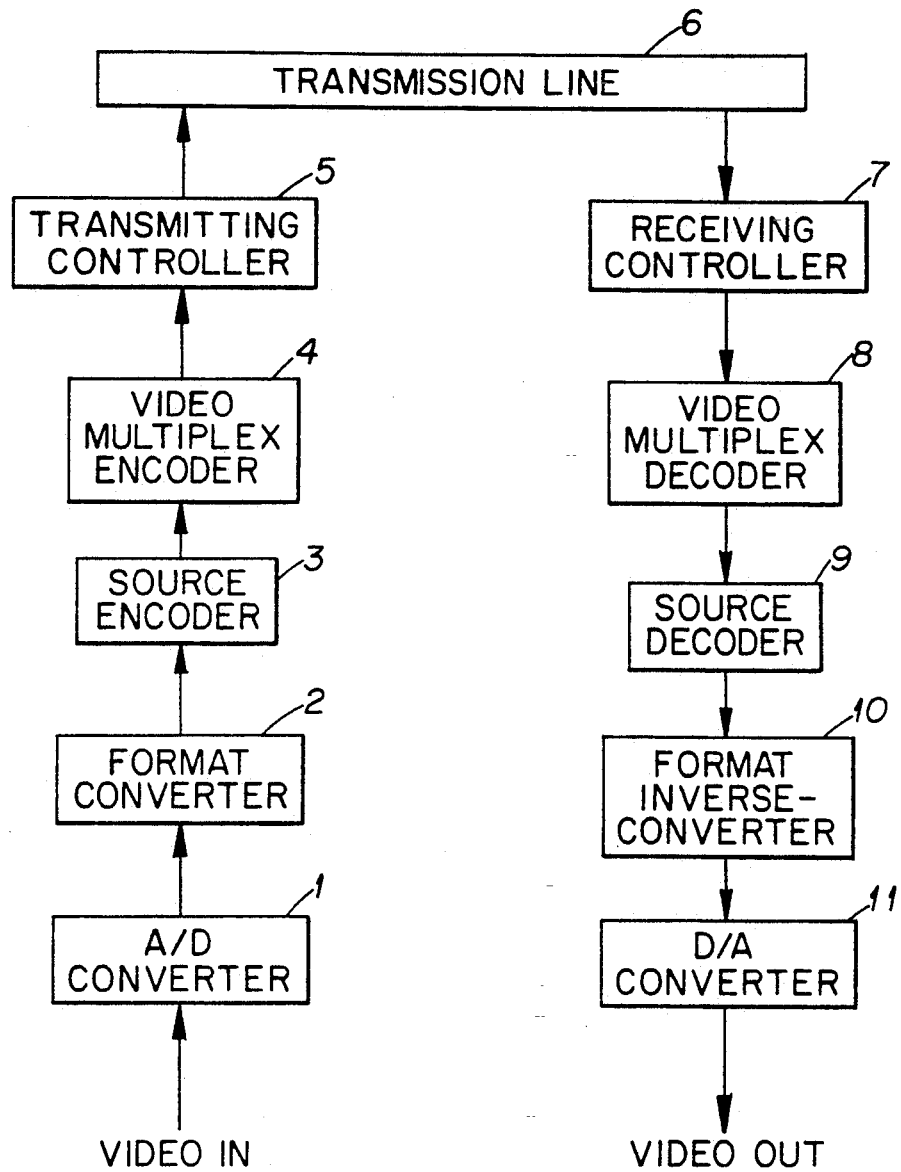
FIG. 1 is a block diagram of a conventional image encoding and decoding system.
Figure 2:
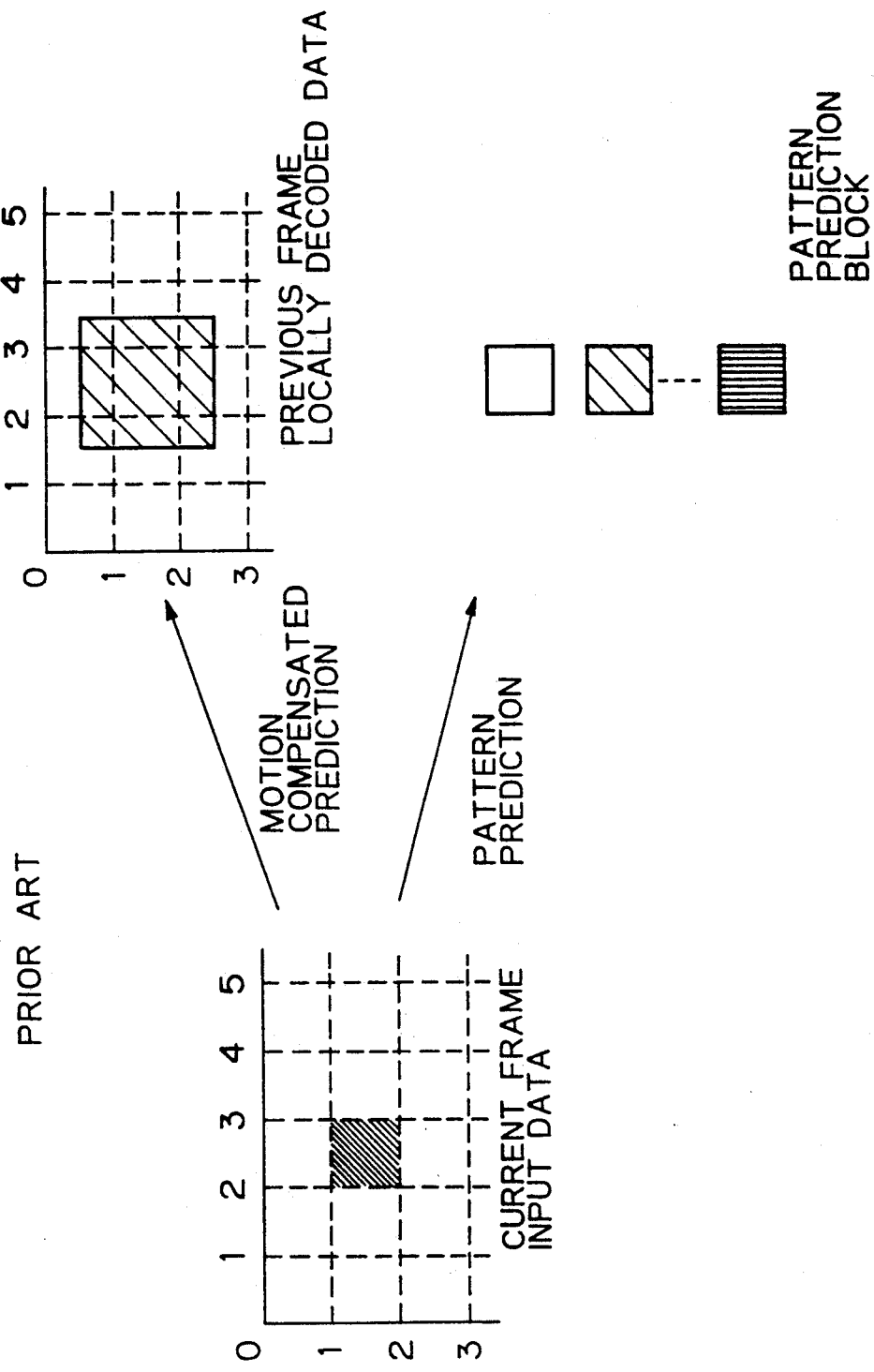
FIG. 2 is a diagram illustrating the concept of MC prediction.
Figure 3:
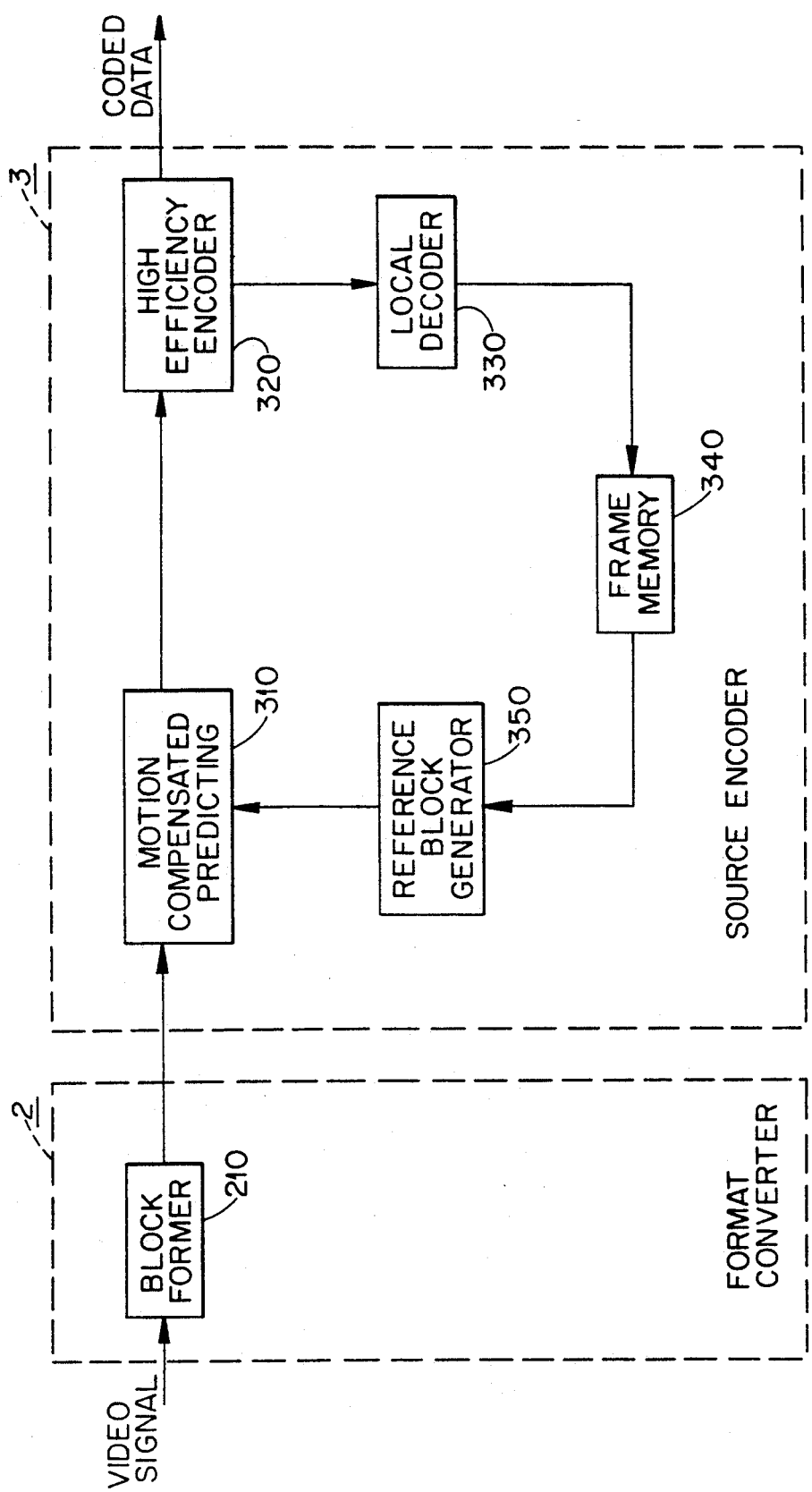
FIG. 3 is a functional block diagram illustrating in detail the structure of a format converter and a source encoder shown in FIG. 1 utilizing a conventional MC prediction.
Figure 4:
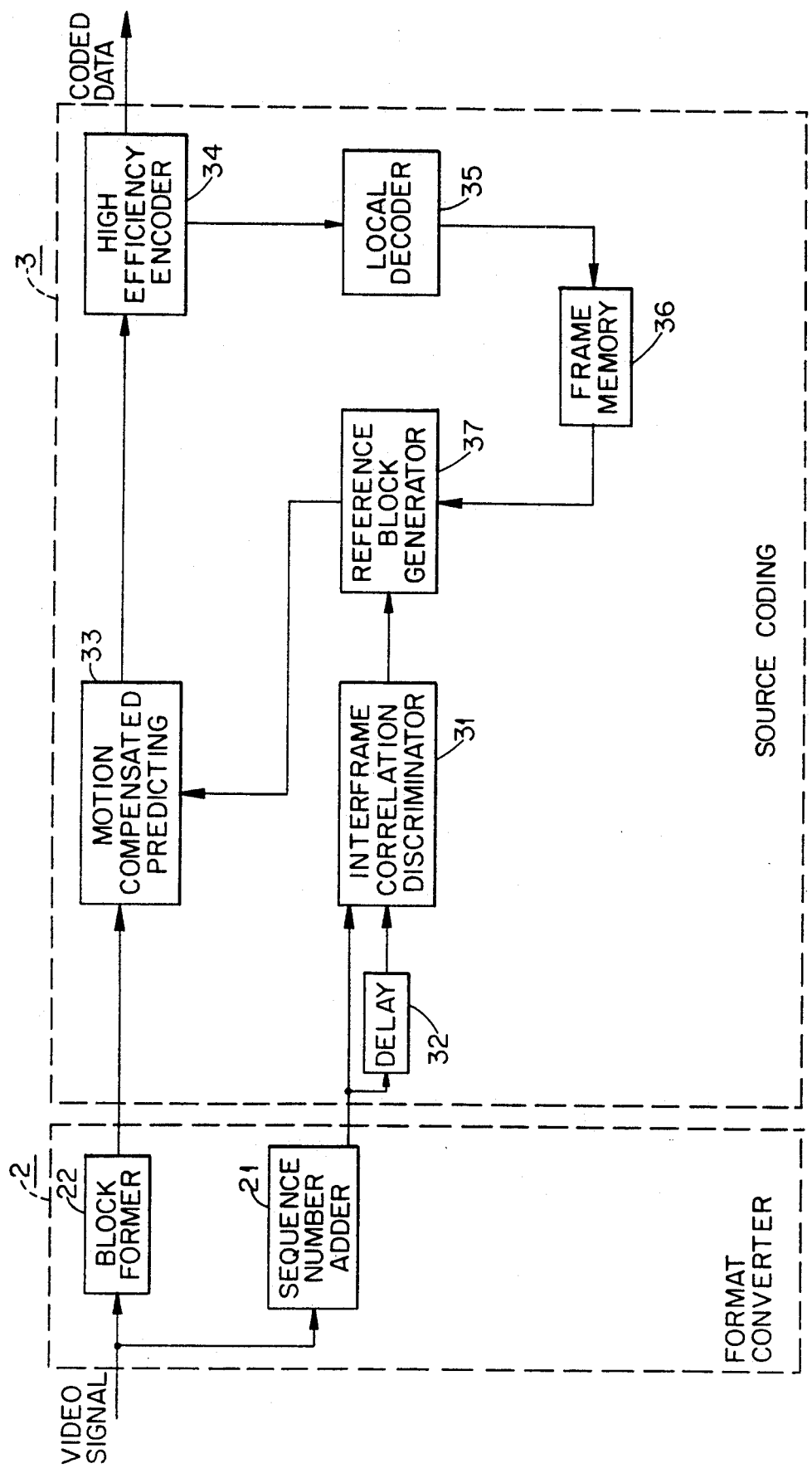
FIG. 4 is a block diagram illustrating the structure of a format converter and a source encoder embodying an MC predicting apparatus according to the present invention.

FIG. 4 is an example of the structure of a source encoder in an MC predicting apparatus according to the present invention. In this figure, reference numeral 2 denotes a format converter; 3 a source encoder; 21 a sequence number adder; 22 a block former; 31 an interframe correlation discriminator; 32 a delay; 33 an MC predicting unit; 34 a high efficiency encoder; 35 a local decoder; 36 a frame memory; 37 a reference block generator.

Operation of each functional block shown in FIG. 4 can be summarized as follows.

A digital video signal is inputted to block former 22 and is formed therein into an input block which is in turn given a sequence number TR in sequence number adder 21 for every frame and then sent to source encoder 3. In source encoder 3, MC prediction is executed for the input block in MC prediction unit 33. Reference block generator 37 accesses frame memory 36 to cause a signal stream in a reference range to be selected from locally decoded signals of the preceding frame as a reference block. The reference range can be varied by adaptive control in accordance with correlation between the current and preceding frames. Correlation between the current and preceding frames can be decided by interframe correlation discriminator 31 which receives the sequence numbers of the current and preceding frames.

The sequence number TR of the preceding frame is delayed by one frame in delay circuit 32. A prediction error block which has been MC predicted is transformed to various encoded data in high efficiency encoder 34 and these data are transferred to video multiplex encoder 4 and local decoder 35. In local decoder 35, the encoded data are locally decoded in a sequence reverse to the sequence performed in high efficiency encoder 34 and are stored in frame memory 36 for MC prediction of the next frame.

Next, an example of the interframe correlation discrimination performed in interframe correlation discriminator 31 will be explained.

As explained above, each frame is given sequence number TR corresponding to a frame rate, and a difference $\Delta$ between the sequence numbers of the current and preceding frames indicates a distance in time between those frames.

Here, an encoding process of a moving image of a moving object, for example, is taken into consideration. In two adjacent frames, since correlation (self-correlation) between the pixels located in the same position has positive relation to a spatial displacement of an object between both frames, it can be understood that a distance in time between two frames gives influence on self-correlation. In this embodiment, a spatial displacement of an object is approximated by a function proportional to a distance in time between frames (difference $\Delta$ in sequence number between frames).

It is noted that the spatial displacement of an object may be approximated by a function other than the function which is proportional to difference $\Delta$ in sequence number between frames.

An example of adaptive control for the reference range of an MC prediction block group to be evaluated during MC prediction will then be explained hereunder.

As explained above, since difference $\Delta$ in sequence number between the current and preceding frames is proportional to a spatial displacement of an object, a reference range of an MC prediction block group around the same position of input blocks is enlarged or narrowed corresponding to difference $\Delta$ in sequence number.

In this embodiment, the reference range of an MC prediction block group can be enlarged or narrowed by preparing for a plurality of different reference ranges, comparing difference $\Delta$ in sequence number with a threshold value Ta and selecting an optimum reference range in accordance with the result of the comparison.

Figure 5:
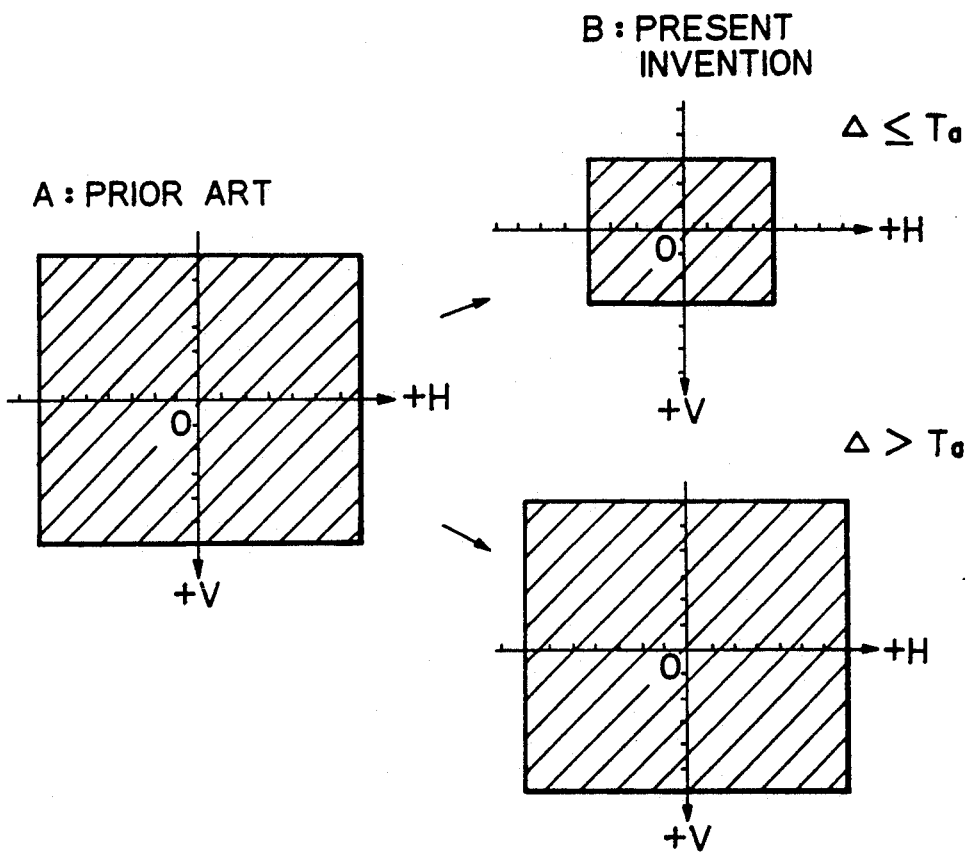
FIG. 5 shows an example of adaptive control of a reference range of an MC prediction block in the MC predicting apparatus of the present invention.

FIG. 5 shows how to adaptively change two reference ranges in accordance with the present invention in comparison with a conventional reference range. This figure shows that, according to the present invention, a reference range is changed depending on whether difference $\Delta$ in sequence number is larger or smaller than threshold value Ta.

In this figure, the origin O of the coordinates corresponds to a standard position of the reference range of an MC prediction block group and a displacement from the standard position is made in the unit of one pixel.

Threshold value Ta is not always a fixed parameter.

As explained above, since a degree of correlation between the preceding and current frames is judged from a difference between sequence numbers of the preceding and current frames and the reference range of an MC prediction block is varied depending on the degree of correlation, the number of arithmetic operations using an MC prediction evaluation function can be advantageously reduced when the motion vectors are expected to be small and prediction accuracy can be improved when the motion vectors are expected to be big.

Another example of adaptive control for the reference range of an MC prediction block group in accordance with the present invention will be explained hereunder.

Contrary to the above example where the reference range of an MC prediction block group is enlarged and narrowed depending on difference $\Delta$ in sequence number, the present example is intended to reduce a reference range in the periphery of the standard position by adequately controlling the standard position of the reference range. The standard position of a reference range can be obtained by compensating the same position as that of an input block by a spatial displacement component (hereinafter, referred to as an initial displacement) corresponding to difference $\Delta$ in sequence number.

Figure 6:
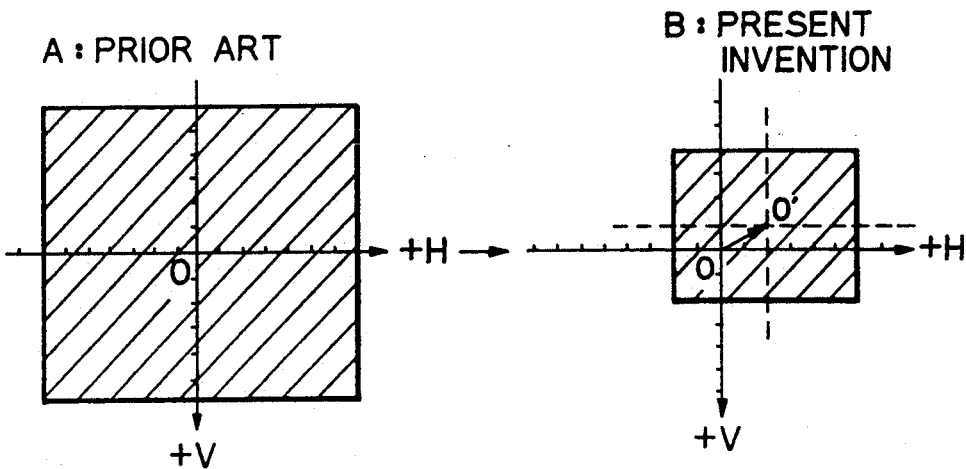
FIG. 6 shows another example of adaptive control of a reference range of an MC prediction block in the MC predicting apparatus of the present invention.

An initial displacement for compensation of the same position as that of an input block can be calculated from a change in time of a motion vector at the above same position and difference $\Delta$ between sequence numbers of the current and preceding frames. The motion vector to be referred to is a motion vector other than a pattern index in previous frames. FIG. 6 shows a concept of this control example in comparison with a conventional reference range. In this figure, the origin 0 of the coordinates corresponds to the same position as that of an input block and a displacement from the standard position is made in the unit of one pixel. A vector from the origin 0 to the origin 0' corresponds to an initial displacement.

Compensation of an object which moves at uniform speed is possible by referring to the frame which is one frame preceding the current frame, and compensation taking acceleration of an object into consideration is also possible by referring to the frame which is two or more frames preceding the current frame. In this example, a number of the previous frames to be referred to is not required to be considered.

As explained above, since the standard position of the reference range of an MC prediction block is compensated by motion vectors of the preceding frames and a parameter determined by a degree of interframe correlation of the preceding and current frames, redundancy of the reference range of an MC prediction block can be reduced.

It is also effective to provide a variable reference range for MC prediction corresponding to difference $\Delta$ in sequence number after the standard position of a reference range of an MC prediction block group is corrected by an initial displacement corresponding to difference $\Delta$ between frames.

What is claimed is:

1. An MC predicting apparatus comprising: means for outputting an input block by forming a block from a digital image signal stream within a frame;
   means for outputting a prediction error block based on a difference between said input block and a prediction block selected from a reference block group, the reference block group including a plurality of prediction blocks located in the same position as, or in the vicinity of, the position of said input block;
   means for adding a sequence number to each frame of the digital image signal stream; and
   means for causing said means for outputting a prediction error block to adaptively control a reference range of the reference block group based on a difference in the sequence numbers of current and preceding frames, said sequence numbers received from the means for adding.

2. An apparatus according to claim 1 wherein said means for causing causes said means for outputting a prediction error block to adaptively change the size of the reference range of said reference block group in accordance with interframe correlation.

3. An apparatus according to claim 1 wherein said means for causing modifies a motion vector of the preceding frame in the same position as that of said input block in accordance with a difference between the sequence numbers of the current and preceding frames, causes said means for outputting a prediction error block to correct the position of said input block using such a modification as an initial displacement, thereby correcting the position of said input block as the standard position of said plurality of prediction blocks.

4. An apparatus according to claim 1 wherein said means for causing causes said means for outputting to adaptively control a standard position and the reference range of said plurality of prediction blocks in accordance with a difference between the sequence numbers of the current and preceding frames.

5. An apparatus according to claim 1 further comprising means for encoding said prediction error block.

6. A motion compensated predicting apparatus comprising:
   a block former which receives a digital image signal and produces an input block;
   a motion compensated predicting unit which obtains a difference between the input block and a selected prediction block from a reference block group and produces a prediction error block based on the difference;
   an encoder which receives the prediction error block and produces coded data;
   a sequence number adder which adds a sequence number to each frame of the digital image signal; and
   an interframe correlation discriminator which receives said sequence numbers of a plurality of said frames and causes the motion compensated predicting unit to adaptively control a reference range of the reference block group.

7. An apparatus according to claim 6 wherein the interframe correlation discriminator causes the motion compensated predictor to adaptively change the size of the reference range of the reference block group based on a difference in the sequence numbers of current and preceding frames.

8. An apparatus according to claim 6 wherein the interframe correlation discriminator modifies a motion vector of a preceding frame in the same position as that of the input block based on a difference between sequence numbers of the current and preceding frames, and causes the motion compensated predictor to correct the position of the input block.

9. An apparatus according to claim 8 wherein the interframe correlation discriminator causes the motion compensated predicting unit to correct the position of the input block by using an initial displacement modification, thereby correcting the position of the input block as the standard position of the plurality of prediction blocks.

* * * * *